US008285731B2

(12) United States Patent
Peeters et al.

(10) Patent No.: US 8,285,731 B2
(45) Date of Patent: Oct. 9, 2012

(54) SMART ROAD-TOLL-SYSTEM

(75) Inventors: Michaël Michel Patrick Peeters, Tourinnes-la-Grosse (BE); Claude Debast, Lembeek (BE); Stefaan Motte, Neervelp (BE)

(73) Assignee: NXP B.V., Eindhoven (NL)

( * ) Notice: Subject to any disclaimer, the term of this patent is extended or adjusted under 35 U.S.C. 154(b) by 134 days.

(21) Appl. No.: 12/958,192

(22) Filed: Dec. 1, 2010

(65) Prior Publication Data

US 2011/0131238 A1 Jun. 2, 2011

(30) Foreign Application Priority Data

Dec. 2, 2009 (EP) .................................... 09177797

(51) Int. Cl.
*G06F 17/30* (2006.01)

(52) U.S. Cl. ........................... 707/754; 707/756; 705/13

(58) Field of Classification Search .................. 707/754, 707/756; 705/13
See application file for complete search history.

(56) References Cited

U.S. PATENT DOCUMENTS 5,602,919 A * 2/1997 Hurta et al. ..................... 705/65
5,974,356 A * 10/1999 Doyle et al. .................. 701/420
6,317,721 B1 * 11/2001 Hurta et al. ..................... 705/13
2009/0259528 A1 * 10/2009 Ebersberger et al. ........... 705/13

FOREIGN PATENT DOCUMENTS

EP 1 821 259 A2 8/2007
EP 2 017 790 A2 1/2009
WO 2009/001303 A1 12/2008

OTHER PUBLICATIONS

Grush et al., Paying for Roads in the 21st Century With TDP Pricing, 2008.*
Gruteser et al., On the Anonymity of Periodic Location Samples.*
Extended European Search Report for European Patent Appln. No. 09177797.9 (Jun. 7, 2010).

* cited by examiner

*Primary Examiner* — William Spieler

(57) ABSTRACT

A road pricing smart client and method for a road pricing system enabling the removal of information from the positioning data describing the itinerary which suggest private data such as travelling speed and itinerary of the originator of the data. Accordingly, the smart client and method is configured to re-sample the original positioning points of the route into equidistant sections, remove timing information from the positioning data, slice the re-sampled route into slices shaped as those provided by other road users by employing a common "virtual grid". By transmitting the slices in randomized order with an arbitrary delay, coherence of slices corresponding to formerly neighboring portions of the itinerary, are not correlated anymore. However, there is still enough information provided to the toll system to send an excerpt of the fee database allowing the smart pricing client or method to calculate the occurred fees.
The main advantage of the smart client and method is that it delegates in a secure and privacy-preserving way the costly operations to the external toll server proxy. Thus, storage of digital maps in the client is not required, and tariff updates are only transmitted when necessary in a way that preserves privacy. Finally the data transmitted by the smart client can be preprocessed and compressed in order to remove all unnecessary personal information, thereby reducing the bandwidth requirements on the telecommunication network. Further, the proposed solution enables to raise statistics on road usage, i.e. traffic appearance by road-section without endangering privacy of the individual road users.

19 Claims, 11 Drawing Sheets

Table 1:

| *i* | $Time_i$ | $Lat_i$ | $Long_i$ |
|---|---|---|---|
| 1 | 12:35:19 UTC | N 48° 07.983' | E 11° 31.000' |
| 2 | 12:35:20 UTC | N 48° 07.991' | E 11° 30.986' |
| 3 | 12:35:21 UTC | N 48° 08.000' | E 11° 30.971' |
| 4 | 12:35:22 UTC | N 48° 08.010' | E 11° 30.955' |
| 5 | 12:35:23 UTC | N 48° 08.021' | E 11° 30.938' |
| ... | | | |

Fig. 10A

Table 2:

| j | Time'j | Lat'j | Long'j |
|---|---|---|---|
| 1 | 12:35:19.0 UTC | N 48° 07.983' | E 11° 31.000' |
| 2 | 12:35:19.8 UTC | N 48° 07.990' | E 11° 30.988' |
| 3 | 12:35:20.6 UTC | N 48° 07.997' | E 11° 30.976' |
| 4 | 12:35:21.3 UTC | N 48° 08.004' | E 11° 30.964' |
| 5 | 12:35:22.1 UTC | N 48° 08.011' | E 11° 30.952' |
| 6 | 12:35:22.9 UTC | N 48° 08.018' | E 11° 30.940' |
| ... | ... | ... | ... |

Fig. 10B

Table 3:

| *j* | $Lat''_i$ | $Long''_i$ | Time Period | Random ID |
|---|---|---|---|---|
| 1 | N 48° 07.983' | E 11° 31.000' | | |
| 2 | N 48° 07.990' | E 11° 30.988' | Dec 25th, 2009 | B5.wYT.# |
| 3 | N 48° 07.997' | E 11° 30.976' | | |
| | *(in compressed format)* | | | |

Fig. 10C

Table 4:

| *j* | $Time'_i$ | Random ID |
|---|---|---|
| 1 | 12:35:19.0 UTC | |
| 2 | 12:35:19.8 UTC | B5.wYT.# |
| 3 | 12:35:20.6 UTC | |

Fig. 10D

Table 5:

| *k* | j | Road Segment ID / Gantry ID | Length | Time Period | Random ID |
|---|---|---|---|---|---|
| 1 | 1 | A | 50 | Dec 25th, 2009 | B5.wYT.# |
| 2 | 3 | B | 0 | | |

Fig. 10E

Table 6:

| *k* | j | Length | Tariff ID | Random ID |
|---|---|---|---|---|
| 1 | 1 | 50 | 145 | B5.wYT.# |
| 2 | 3 | 0 | 236 | |

Fig. 10F

Table 10:

| Tariff ID | Type | $Period_0$ | $Price_0$ | $Period_1$ | $Price_1$ | $Period_2$ | $Price_2$ |
|---|---|---|---|---|---|---|---|
| 145 | Fixed unitary | 0h-24h | € 0.60 | | | | |
| 236 | Variable | 0h-12h | € 5.00 | 12h-13h | € 12.00 | 13h-24h | € 5.00 |

Fig. 10G

SMART ROAD-TOLL-SYSTEM

CROSS-REFERENCE TO RELATED APPLICATION

This application claims the priority under 35 U.S.C. §119 of European patent application no. 09177797.9, filed on Dec. 2, 2009, the contents of which are incorporated by reference herein.

FIELD OF THE INVENTION

The present invention relates to road toll systems, for implementing an automatic payment system for deducting road tolls based on the road sections used. Further, the present invention relates to road pricing smart clients.

The present invention particularly relates to an improved road pricing smart client in an on-board equipment of a vehicle for a smart road-toll-system which provides for security for and preserves privacy of sensitive data such as travelling route and travelling speed.

BACKGROUND OF THE INVENTION

The integrated use of telecommunications and informatics is known as telematics. Vehicle telematics systems may be used for a number of purposes, including collecting road tolls, pay-as-you-drive insurance, managing road usage (intelligent transportation systems), tracking fleet vehicle locations, recovering stolen vehicles, providing automatic collision notification, location-driven driver information services and in-vehicle early warning notification alert systems (car accident prevention such as e-Call or b-Call).

Road tolling is considered as the first likely large volume market for vehicle telematics. Telematics is now beginning to enter the consumer car environment as a service box for closed services such as e-Call, theft prevention, car breakdown assistance etc. These markets have been low in volume so far and are considered as niche markets. The European Union with The Netherlands as a leading country has the intention to introduce road tolling as an obligatory function for every car from 2012 onwards.

So far, road tolling has been used for high way billing, truck billing and billing for driving a car in a certain area (e.g. London city). Toll plazas at which vehicles must stop are generally used, or else short range communications systems allow automatic debiting of a fund when a vehicle passes. The road tolling functions required in the near future will impose the requirement for less (or no) infrastructure and will impose tolling for every mile driven.

It is envisaged that an on-board equipment (OBE) in the vehicle (e.g. a car or truck or the like) will employ the global positioning system (GPS) (more generally a global navigation satellite system, GNSS) on-board and communicate via a mobile communication connection such as mobile telephony network, e.g. the Global System for Mobile Communications (GSM), to enable information to be relayed to a centralized road tolling apparatus for use in determining a road toll due, or for other purposes.

The charging system in an automated road toll system can be based on one or more of the distance travelled, the time, location, and vehicle characteristics. The road tolling may apply to all vehicles or it may exclude certain classes of vehicle (for example with foreign number plates). The cost can be calculated based on the path taken by the vehicle, as reported by OBE. For instance, the OBE as the mobile apparatus of the system is used to establish an internet-like connection with the road tolling back-end server of the stationary apparatus of the system.

There are two basic types of a mobile entity (or mobile apparatus) or OBE, and these will be described as "super-fat" and "thin" client solutions. In the super-fat client scenario, it is the OBE that processes the GPS data to perform map matching and trip cost computation, before transmitting the resulting trip cost to the road tolling back-end server. In this connection it is noted, that the term "trip" is used for undertaking a travel from "point A to point B" independent from a certain route or itinerary. It is very easy to maintain driver privacy in this scenario; since the GPS data remain within the OBE and only a single FIGURE (the trip cost) along with the OBE identity are communicated externally.

In the thin client scenario, the map matching and trip cost computation steps are performed by an external server, hence endangering the privacy of the driver, either because the data could be intercepted by a third party during transmission or because (in the worst case) the external server could itself be part of governmental, e.g. law enforcement authorities/agencies, or organizational monitoring of individuals' travels. In the standard solution for the thin client scenario, the drivers have no other choice than to trust that the system is robust and that their data are not used for other purposes than the road tolling application. The thin client scenario has the advantage that the computation power needed by the OBE is lower, and that only the back-end server needs to be updated when maps are updated.

WO 2009/001303 A1 discloses a road toll system employing vehicle mounted equipment having a satellite navigation receiver. The map matching and trip cost computation steps are anonymously delegated by the on-board equipment to an external unit.

SUMMARY OF THE INVENTION

It is an object of the present invention to provide valuation of at least one characteristic of usage of traffic infrastructure (in particular comprised of roads, railways, water ways, and the like and/or gantries such as tunnels, bridges, ferries and the like as well as corresponding services), while meeting the high privacy expectations of the individual users.

In a first aspect of the present invention a method in a mobile entity or mobile apparatus as so-called on-board-equipment (OBE) for valuating a characteristic of usage of traffic infrastructure, in particular roads, according to claim 1 is presented.

Accordingly, the method comprises processing in said mobile apparatus of positioning data representing a route taken by the mobile apparatus in said traffic infrastructure by the steps of at least one of (a) re-sampling the positioning data of the route, e.g. taken by a traffic infrastructure user, (b) generating bundles of said re-sampled positioning data, and (c) re-arranging or scrambling said generated bundles.

The bundles can then be transmitted to a corresponding stationary entity or stationary apparatus of the infrastructure toll system.

Such method may be beneficially employed in a road toll system, though application of the present invention is possible with other traffic infrastructures such as railway, airway and seaway. In the case of applying the herein proposed solution with railway traffic, it is possible for example to estimate the cost for a route taken by an entire freight train, and/or for individual (freight) railcars, and/or even for an individual (freight) container. Since in particular internationally moved railcars on their routes frequently are moved in combination with different trains, locomotives and railroad ferry boats, estimation of cost for the use of infrastructure and services by an individual railway is facilitated by the herein proposed solution. Accordingly, either the locomotive or each (freight) railcar or (freight) container carries a mobile entity or OBE.

Generally, the mobile entity which e.g. can be a hand-held device, a built-in device in a vehicle or a hardware or software component employing appropriate periphery of a vehicle's infotainment system of the road user determines his/her position by using positioning systems such as GPS, A-GPS (assisted GPS), short distance transmission such as Bluetooth or Wi-Fi (especially in the case of a railway traffic) or the like and records these data over time. Also, other communication system infrastructure such as Wi-Fi-hot-spots could be alternatively employed e.g. by using triangulation algorithms.

In this context, it is worth to be noted that the mobile entity may be associated to a particular vehicle using the infrastructure. Alternatively, the mobile entity may be associated to a particular user of different vehicles. Then the user could carry the mobile entity or the user, when using the infrastructure, is linked via a trusted element (TE), e.g. a smart card, with a mobile entity installed as on-board-unit (OBU) in the vehicle. Thus, the OBU together with the TE builds the OBE for valuation of the at least one characteristic of the usage of the traffic infrastructure by the user. This arrangement would be particularly useful for instance with rental cars or even public transportation.

In order to prevent revealing private information from which speeding or other personal road usage characteristics can be derived, only those data necessary for estimation of traffic infrastructure usage costs are transmitted. This means, that for example, the traffic infrastructure user's identity, a certain travelled distance and the corresponding travelling time period should be not visible to any other party.

Thus, the present invention proposes as one step to re-sample the positioning data collected by a traffic infrastructure user in said mobile entity or apparatus. In other words, the geometry of the trip, i.e. the route or itinerary, is maintained but described by new sampling points the distance between which may be equidistant. In this connection it is noted, that the term "trip" is used for undertaking a travel from "point A to point B" independent from a certain route or itinerary.

The step of re-sampling may comprise transforming the positioning data recorded at substantially equidistant points in time into positioning data corresponding to equidistant points in space.

In order to minimize correlation between the route travelled by an individual driver corresponding to the positioning data obtained by the mobile entity and transmitted to the stationary entity, the positioning data recorded in the mobile entity may be bundled (or the route is "sliced") and subsequently those bundles (or the "slices" of the route) may be re-arranged or scrambled prior to transmission to the stationary entity or mobile apparatus.

The generation of an individual bundle from the re-sampled positioning data may comprise analyzing said re-sampled positioning data with respect to districts defined by a predetermined grid, in particular the districts being cells of a predetermined, standardized virtual grid in a system of geographic coordinates, and creating the bundle as comprising those re-sampled positioning data lying in the same district.

There are several possibilities for modifying the re-sampling step, which are described independently of each other but actually can be applied simultaneously.

According to a first aspect, re-sampling may comprise mapping each positioning data point to the nearest point of a common grid. This may be achieved by decreasing the accuracy of the positioning data, for example the data of GPS fixes, thereby limiting the maximum resolution to a predetermined value, for example to 1 or 2 meters. A simple implementation is to cut the least significant digits of the positioning data. This results also in a better compression of the positioning data since the unnecessary least significant bits are removed. Moreover, the likelihood that two vehicles taking the same roads have overlapping coordinates is increased.

According to a second aspect, the re-sampling may be reset and restarted each time the mobile apparatus, i.e. the vehicle carrying the apparatus, crosses the border of a predefined district or cell, as if a new route is started right at the border of the district or cell. The effect of this operation depends on the re-sampling algorithm, but typically this means that a positioning data point is always generated at the intersection of the borders of a district or cell and the route, and fed to re-sampling algorithm as the last position in the cell that is left or exited. Further, the last position in the cell that is left or exited is used as the new initial position of the mobile apparatus when the re-sampling algorithm restarts, and so is also the first fix for the respective slice in the district or cell. This avoids that the fact that the distance between two positioning data points is constant to correlate slices of a particular route in neighboring districts or cells.

According to a third aspect, the re-sampling algorithm does not use the original positioning data sequence, e.g. sequence of GPS fixes, received from the employed positioning system, e.g. GPS satellites, as input but one derived from it which is obtained by applying a constant jitter offset to each positioning data in the original sequence. The jitter offset can be both in latitude and longitude, and/or positive and negative. Whenever the mobile apparatus crosses the border of a cell or district, the apparatus terminates the slice of the district or cell being left or exited, generates randomly a new jitter offset to be applied in the new cell, and starts the generation of a new slice. In combination with the other aspects, this means that the last position in the cell being left or exited was computed with the previous jitter value, and that the first position of the cell being entered is computed with the new jitter value. As a result, the last position of a slice and first position of the subsequent slice are always aligned on the cell border (by construction) but are in most case not overlapping each other.

The correlation between such bundles can be comparatively high and thus recovery of the original route of an individual driver is expected to be correspondingly easy, if transmitted in a continuous or subsequent transmission. Thus, by scrambling or re-arranging the bundles of a particular route may be transmitted not continuously or subsequently. The re-arranging of the generated bundles may comprise at least one of: shuffling said bundles, and/or randomized shifting of each of said bundles, in particular bundles of more than one particular route, with respect to a time. Also, any other suitable randomizing scheme for changing the order of the bundles is applicable. This results in that each bundle is arbitrarily or randomly delayed before transmission to the stationary entity. That is to say, the re-arranged bundles may be delayed by a predetermined time period, such as one day or several days and/or different routes, before a transmission to an external entity for valuating a characteristic of the usage of the traffic infrastructure takes place.

Similarly, the timestamp contained in the positioning data themselves could be used for recovery of the original route of an individual driver. Thus, any associated time stamp may be removed from the positioning data (or "bundles") and optionally replaced by a more general indication (e.g. the date, the week) on when the corresponding portion of the original route was travelled before transmission to the stationary entity. The common time period information for all positioning data of one bundle may serve for enabling a association of a predetermined fee table to the route, the positioning data belong to.

In a further aspect of the present invention a method in a stationary entity for valuating a characteristic of usage of traffic infrastructure (in particular comprised of roads, railways, water ways, and the like and/or gantries such as tunnels, bridges, ferries and the like as well as corresponding services), according to claim 7 is presented.

Accordingly, the method comprises the steps of (i) receiving positioning data from a mobile apparatus, which positioning data processed by a method according the method discussed herein above, (ii) matching by said stationary apparatus the information contained in said bundles with a database containing information, in particular map information, representing said traffic infrastructure, (iii) determining a partial route taken or a certain position passed by said mobile apparatus, (iv) associating at least one predetermined route criterion with said partial route or a certain position in said route, and (v) transmitting the at least one predetermined route criterion to the mobile entity or apparatus.

The information contained in the received bundles representing a partial route the user has been travelling can be matched with digital map material, e.g. stored in a corresponding database such as servers associated with the stationary entity. Since the map material is not necessarily present in the mobile entity or on-board-equipment (OBE), no such data have to be updated over the air in the mobile entity, which significantly reduces necessary data traffic. Furthermore, the matching operation causing need for comparatively high computing power can be carried out on the stationary entity, lowering the need for high computing performance in the mobile entity.

Thus, in the stationary entity a partial route i.e. a portion of the physical road the user has travelled is determined and information on toll fees due for said partial route are associated. Since not only the physical distance on a certain route is relevant for the produced costs but possibly also the time of the day, the length and weight of the vehicle, several discounts for e.g. disabled users or users taking a detour in reaction to the current traffic situation, a certain physical section of a road taken by the user, each may be associated with a plurality of parameters or table of parameters the relevant fee is to be derived from.

In another aspect of the present invention a mobile entity or apparatus, which may be an on-board equipment (OBE), according to claim 10 is provided.

Accordingly, the mobile apparatus comprises positioning means, in particular a positioning unit, configured to estimating positioning data of a traffic infrastructure user in a mobile apparatus; processing means, in particular a processor unit, configured to execute the steps (a) to (c) of the method in a mobile apparatus for valuating a characteristic of usage of traffic infrastructure, in particular roads, as discussed above; transmitting means, in particular a transmitter unit, configured to transmit the re-arranged positioning data to a stationary apparatus of said system.

As discussed above in connection with the mobile entity, such an OBE may be comprised of the on-board-unit (OBU) combined with a trusted element (TE). Because everyone will have to participate in such a road pricing system, fraud should be prevented. As part of anti-fraud measures, the equipment in the OBE may include a so-called Trusted Element (TE), which may be a chip similar to one in the SIM card in a mobile telephone or such as the ones found in banking smart cards. The TE can be used to provide the security for the positioning data and other data to be sent.

The mobile apparatus or mobile entity may employ satellite navigation means signals such as GPS signals in order to determine its position. As explained in connection with the corresponding method above, also other systems and methods both known now and which may be discovered hereafter can be employed for determining the position of the mobile apparatus.

The mobile apparatus may comprise storage means or a memory unit for storing the obtained positioning data during a trip of the associated vehicle. Further, the storage means may be used for storing the re-sampled positioning data. Furthermore, the storage means may contain information on a virtual grid employed for bundling or slicing of the determined positioning data. This information on how to re-sample and the determined positioning information are not subject to frequent updates and can be essentially the same in every mobile entity being part of the present system for valuating a characteristic of usage of traffic infrastructure.

The mobile entity further is provided with processing means such as single programmable processor or distributed processing function arrangement. Since the computing power required by the mobile entity according to the herein proposed solution is kept comparatively low, a processor like those employed in handheld computers or mobile phone devices can be sufficient.

In a certain embodiment, the mobile entity is implemented as part of a handheld device. This can comprise every feature and function of the mobile entity or it can use data and components already present in the vehicle. In another embodiment, the mobile apparatus may be provided as a separate device (control unit) fixedly installed in the vehicle. In yet another embodiment of the mobile apparatus, most of the relevant features may be implemented in a separate hardware board or an additional integrated circuit or the like attached to or located in another component or control unit of the vehicle, such as the head unit of an infotainment system.

In yet another aspect of the present invention a stationary entity for a system for valuating a characteristic of usage of traffic infrastructure (in particular comprised of roads, railways, water ways, and the like and/or gantries such as tunnels, bridges, ferries and the like as well as corresponding services), according to claim 11 is presented.

Accordingly, the stationary apparatus comprises receiving means, in particular a receiver unit, configured to receive positioning data sent by a mobile apparatus as discussed above, processing means, in particular a processor unit, configured to execute the steps (ii) to (iv) of the method in a stationary apparatus for valuating a characteristic of usage of traffic infrastructure (in particular comprised of roads, railways, water ways, and the like and/or gantries such as tunnels, bridges, ferries and the like as well as corresponding services), and transmitting means, in particular a transmitter unit, configured to transmit the at least one predetermined route criterion to said mobile apparatus.

In a certain embodiment, the stationary apparatus is a Toll Service proxy (TS proxy).

The stationary entity or apparatus comprises at least one processor and/or is capable of employing distributed processing means to perform the steps of the above-defined method. The stationary apparatus further comprises storage means wherein at least geographical data such as map information or other material for the relevant area, e.g. The Netherlands, as well as tariff (toll fee) information for the traffic infrastructure comprised in the stored maps is defined. Hosting the geographical data and the tariff information is widely centralized and thus data logistics and data traffic do not pose severe problems when updating the corresponding databases. Yet further, the stationary apparatus is provided with communication capability and communication interface, e.g. to the internet or other communication means, and may thereby be connectable to and contactable by the mobile entities (OBEs) via wireless communication such as GSM, SMS, GPRS, UMTS and others both now known and which may be discovered hereafter.

Thus, the mobile apparatus and the stationary apparatus build up a system for valuating a characteristic of usage of traffic infrastructure (in particular comprised of roads, railways, water ways, and the like and/or gantries such as tunnels, bridges, ferries and the like as well as corresponding services).

The communication between the stationary apparatus and the mobile apparatus can be configured such that the communication path, at least partially, comprises an anonymous channel, and/or a server providing network address translation between the stationary apparatus and the mobile apparatus, and/or a network with an onion router, and/or an intermediate mix and forward proxy using user datagram protocol packets with forged source IP, and/or a peer-to-peer network, using other mobile apparatus to relay the data of an mobile apparatus.

DETAILED DESCRIPTION OF THE INVENTION

The present invention is further elucidated by the following figures and examples, which are not intended to limit the scope of the invention. The person skilled in the art will understand that various embodiments may be combined.

BRIEF DESCRIPTION OF THE DRAWINGS

These and other aspects of the invention will be apparent from and elucidated with reference to the embodiment described hereinafter. In the following drawings FIG. 9 shows a scheme of main components of a stationary entity and FIGS. 10A-G show examples of tabular data for use in calculations according to the invention.

DETAILED DESCRIPTION OF CERTAIN EMBODIMENTS

Figure 1:
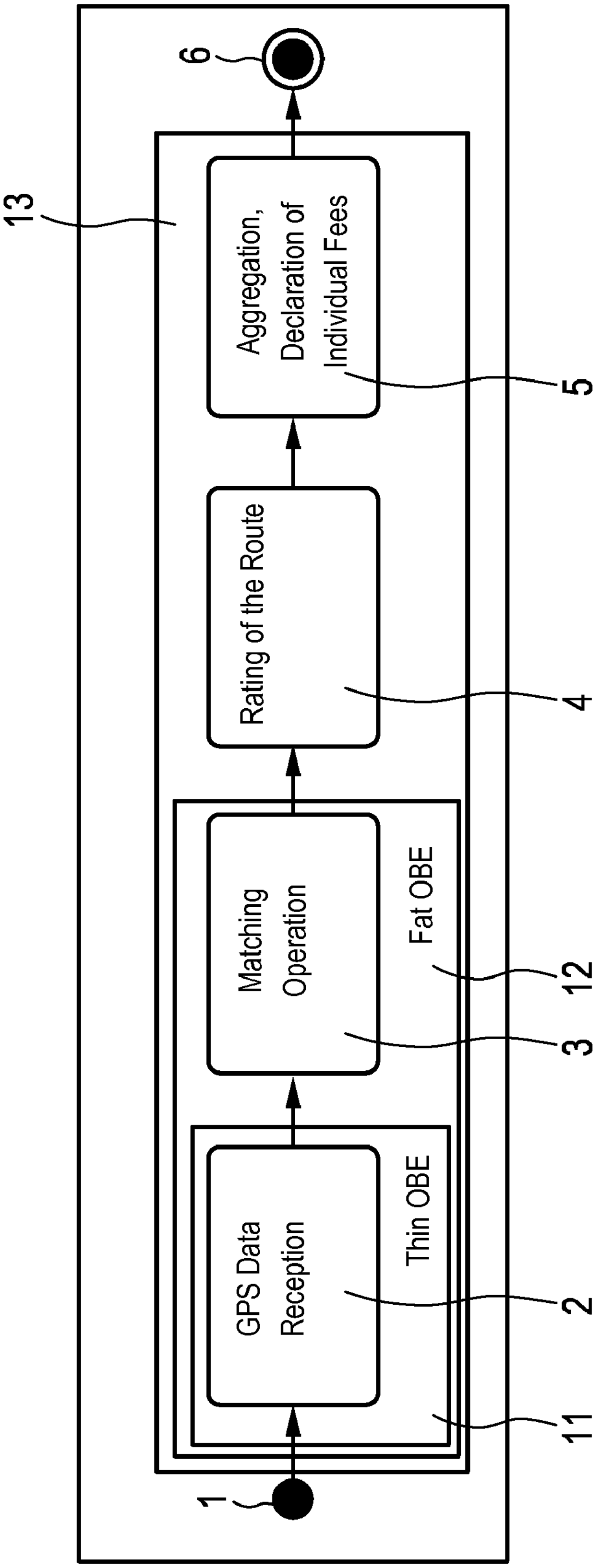
FIG. 1 shows a scheme of a process of the road pricing.

FIG. 1 shows the general client process of toll-fee estimation from a high-level perspective in four sub-processes. The toll-fee estimation process is explained on the basis of GPS employed for positioning of a car as vehicle using a traffic infrastructure comprising roads.

Starting from 1, step 2 represents the step of GPS data reception. During this process, the client collects the GPS data corresponding to the tolled vehicle. The output of this process can be seen as a sequence of so-called GPS "fixes" comprised of positioning data and an associated timestamp. These GPS fixes describe the movement of the vehicle. Box 11 represents the processes performed by the "thin" on-board equipment (OBE). An example of such GPS fixes is set out in FIG. 10A, which is an example of output generated by a GPS data reception process.

In step 3, the map or zone "matching" operation is performed, meaning the collected GPS data are then matched on a digital map of roads or zones. Due to biases, like obstacles or noises, the position of the vehicle reported by the GPS data may not always locate precisely on the road network as recorded on digital maps. Without correction these biases can lead to inaccuracies that eventually could lead to incorrect fee calculation. The map matching process circumvents this problem by matching the GPS data to a map of roads, basically finding the roads that are fitting best the reported locations. The output of this process is a sequence of road identifiers (and timestamps) corresponding to the roads traversed by the vehicle.

In some scheme the toll is not based on the roads that were taken by the vehicle but instead on the geographical zones that the vehicle traversed. For instance a zone may correspond to the area of a city, or to an urban center. Zones can also be used to implement virtual "gantries", i.e. tolled road portals such as a toll bridge. In that case the toll is due when the vehicle crosses the gantry. The "fat" OBE (indicated by box 12) is capable of performing the steps 2 and 3.

Step 4 represents the rating of the route, in which step the fee for the trip of the vehicle is computed. The fee usually depends on the type of roads, the number of kilometers driven, time of travel and type of vehicle. The rating scheme may also depend on personal characteristics of the vehicle or driver e.g. if the vehicle is an ambulance or the driver is a disabled person, and/or on mobility requirements e.g. if the vehicle is taking this road to reduce traffic in other network or on interaction with other transport means if the vehicles destination is a public transport (e.g. "park-and-ride") station.

Step 5 represents the aggregation and declaration of individual fees. The fees computed in the previous step 4, i.e. the individual fees are aggregated (i.e. summed up) e.g. for a certain period of time, a maximum amount of driven kilometers, and/or when the vehicle crosses some predetermined point, a gantry, and/or border of a geographic zone and then reported to the driver/vehicle owner for payment. The length of the aggregation period is usually defined by the Tolling Scheme. When this predefined period has elapsed, the final result, i.e. the total sum of aggregated fees, is signed, and the signature and total fee is transmitted to the road pricing back-end system. In other words, at the end of the aggregation period a declaration is made that formally reports to the back-end system how much must be paid for the elapsed period, along with other information as required by the tolling scheme or regulations. This could be for instance, that the declaration should contain the minimum information that will appear on toll invoices.

As mentioned above, a so-called super-fat OBE is capable of performing all steps 2 to 5, however the related requirements in terms of license fees associated with digital maps, hardware complexity, processing power and data traffic updating so far complicates entry of such a device into the market.

Figure 2:
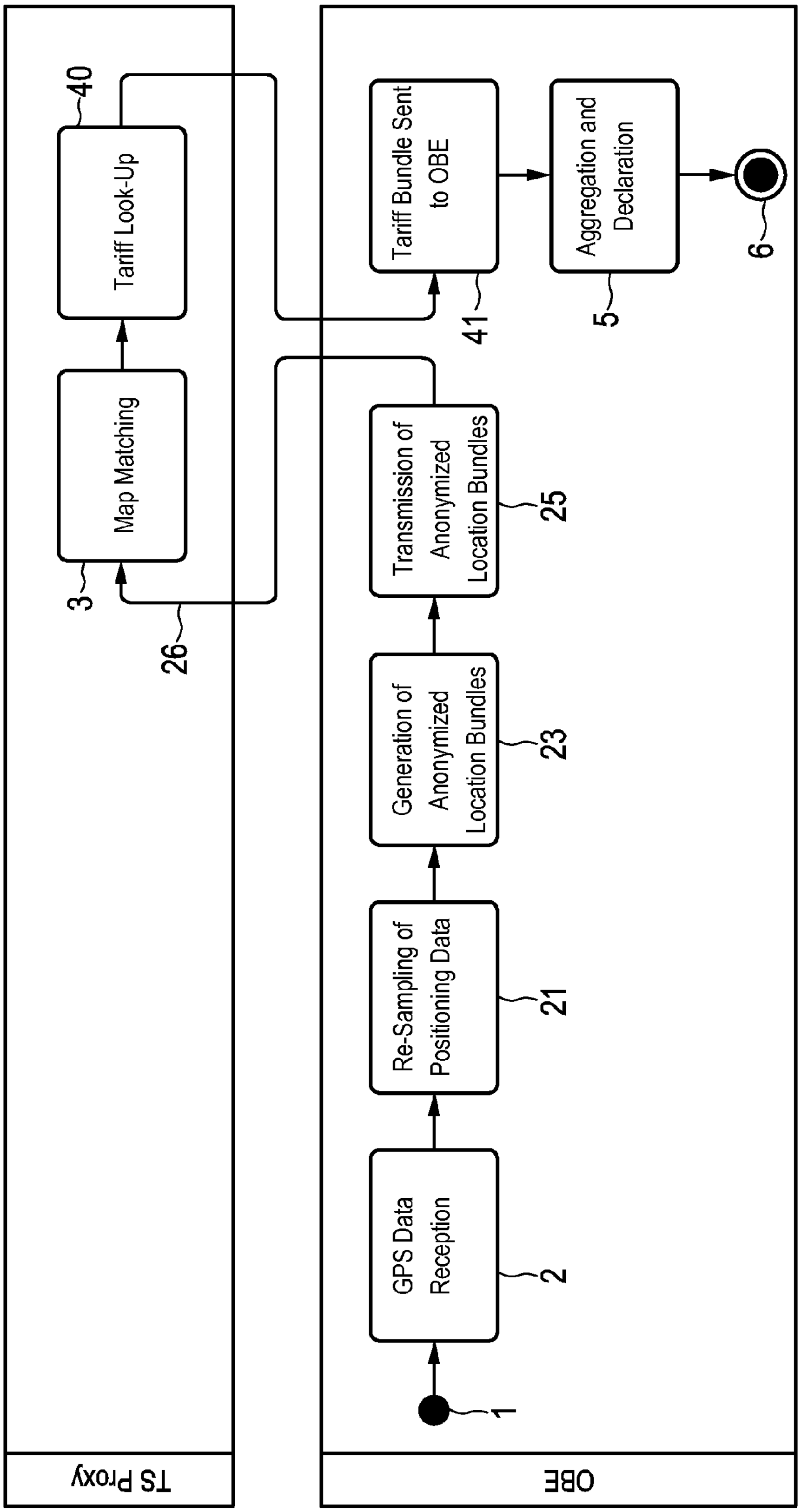
FIG. 2 shows a scheme of the smart client process according to the present invention.

FIG. 2 depicts the method for valuating a characteristic of usage of traffic infrastructure according to the herein proposed solution, a "smart client". Steps 1 ("start"), step 2 ("GPS Data Reception"), step 3 ("Map Matching") and step 5 ("Aggregation and Declaration") have been explained in connection with FIG. 1, thus further discussion of these steps is omitted in connection with FIG. 2.

In step 21, the step of "re-sampling" of the positioning data, i.e. the obtained sequence of GPS fixes during a trip, is transformed into an equivalent one in order to remove individual properties from the positioning data sequence. The effect of this process is depicted in FIGS. 3A and 3B.

Figure 3B:
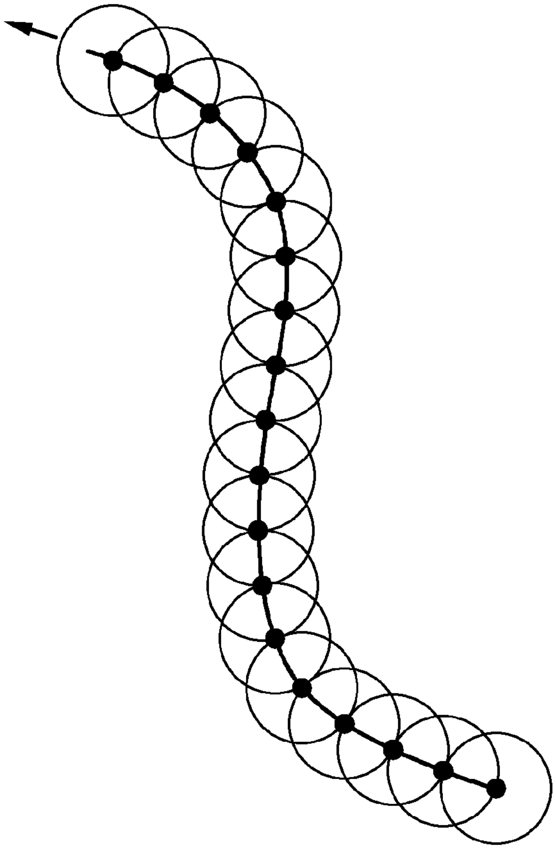
FIGS. 3A, 3B show a visualization of the equidistant resampling method.
Figure 3A:
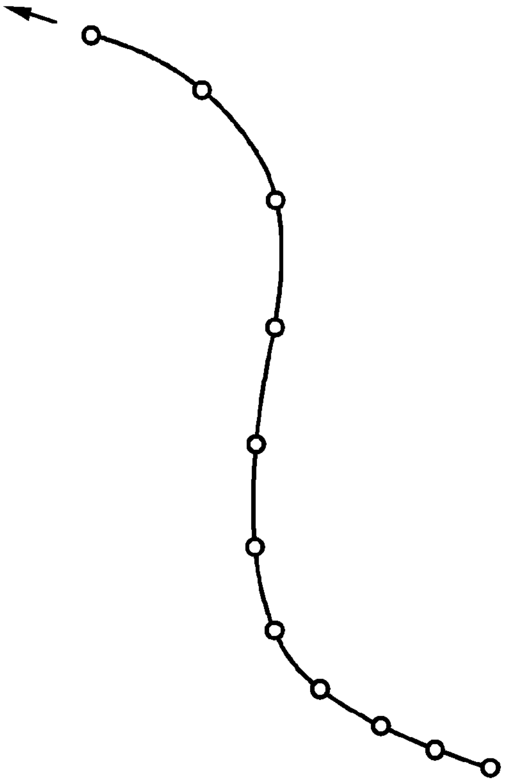

FIG. 3A depicts an example of positioning data (e.g. GPS fixes) distribution on the route or itinerary of the vehicle. Due to varying speeds of the vehicle carrying the OBE the obtained points of the positioning data are non-equidistant. Since the positioning data represent locations of the vehicle and the corresponding timestamps, at least average travelling speed between two neighboring checkpoints can be derived, which negatively effects the traveler's privacy.

In order to preclude the possibility of deriving the travelling speed of the vehicle from the data sent by the OBE, as shown in FIG. 3B the itinerary is re-sampled in a way such that equidistant sampling points are yielded. In other words the method consists in generating a new sequence of GPS fixes that corresponds to the same route or itinerary as the original sequence. Moreover, the timestamp associated with each re-sampled fix in the new sequence is interpolated from the ones in the original sequence. An example of such re-sampled positioning data is set out in FIG. 10B.

This re-sampling process is performed by the following steps: At the start of a new trip, the OBE generates an initial re-sampled fix that is equal to the first fix generated by the GPS Data Reception process. This very first re-sampled fix in the following step is referred to as the latest re-sampled fix. Then, each time the OBE receives a new GPS fix, it computes the distance between this GPS fix and the latest re-sampled fix. Whenever this distance exceeds some predefined threshold value (for instance 50 meters), the OBE will generate a new re-sampled fix such that the distance between the new re-sampled fix and the latest re-sampled fix is equal to the threshold value (i.e. 50 meters in this example), and such that the new re-sampled fix is located on a straight line joining the latest received GPS fix and the re-sampled fix generated previously. If the predefined threshold value used in all OBEs in the system is the same, there is no information added to the fixes that could boost correlation between or individuality of fixes, resulting in a higher privacy level for the driver. Finally, the OBE computes the timestamp of the re-sampled fix by linear interpolation between the timestamp of the latest received fix and the timestamp of the fix received previously. The thus generated fix becomes then the new latest re-sampled fix. This operation is repeated until the end of the trip. Accordingly, the latest re-sampled fix is equal to the latest GPS fix that the OBE received.

Also, there are other re-sampling methods that can be considered.

For instance, using spline interpolation (i.e. finding the sequence of spline curves that best match the sequence of positioning data, e.g. the GPS fixes).

Another re-sampling method may be based on the concept that the new re-sampled sequence of positioning data points is the same as the original sequence but discarding as many points as possible and such that the distance between each of discarded point and the new re-sampled path is below some predefined threshold.

Also it is possible to combine re-sampling methods. For instance in a first step the re-sampling method may be applied, in which transforms the positioning data recorded at substantially equidistant points in time into positioning data corresponding to equidistant points in space. Then, in the re-sampled sequence of positioning data points as many points as possible may be discarded as long as the distance between each discarded point and the resulting new re-sampled path is below a predefined threshold in order to achieve both removal of any speed information and maximum compression.

There are several possibilities for modifying the re-sampling step, which are described in the following. The possible modifications are described independently of each other but actually can be applied simultaneously.

A first way is to decrease the accuracy of the positioning data, i.e. the GPS fixes, in order to limit the maximum resolution to for example 1 or 2 meters, e.g., by cutting the least significant digits of the location information contained in the GPS fix. The purpose on one hand is to allow better compression of the positioning data by removing unnecessary least significant bits. On the other hand, the likelihood can be increased that two vehicles taking the same roads will have overlapping coordinates; in other words, this results in that each positioning data point is mapped to the nearest point of a common grid.

A second way is to reset and restart the re-sampling algorithm each time the vehicle crosses the border of a cell, i.e. a predefined district, as if the vehicle started a new trip right at the cell border. The effect of this operation depends on the re-sampling algorithm, but typically this means that (1) a fix is always generated at the intersection of the cell border and the vehicle path, and fed to re-sampling algorithm as the last fix in the cell being exited, and that (2) the new fix is used as the new initial position of the vehicle when the re-sampling algorithm restarts, and so is also the first fix for the respective slice in the district or cell.

The second (2) step avoids that the TS Proxy uses the fact that the distance between two GPS fixes is constant to correlate slices of a particular route in neighboring cells.

A third way is, that the re-sampling algorithm does not use the original positioning data, i.e. GPS fix sequence received from the satellites as input but one derived from it which is obtained by applying a constant GPS jitter offset to each fix in the original sequence. The jitter offset can be both in latitude and longitude, and/or positive and negative. Whenever the vehicle crosses the border of a cell or district, the OBE closes the slice of the cell being exited, generates randomly a new GPS jitter offset to apply in the new cell, and starts the generation of a new slice. In combination with the previous strategy, this means that the last fix of the cell being exited was computed with the previous jitter value, and that the first fix of the cell being entered is computed with the new jitter value. As a result, the last fix of a slice and first fix of next slice are always aligned on the cell border (by construction) but are in most case not overlapping each other.

Referring back to FIG. 2, in the next step 23 of the method generation of anonymized location bundles is performed that is described in connection with FIG. 5 and FIG. 6.

Figure 5:
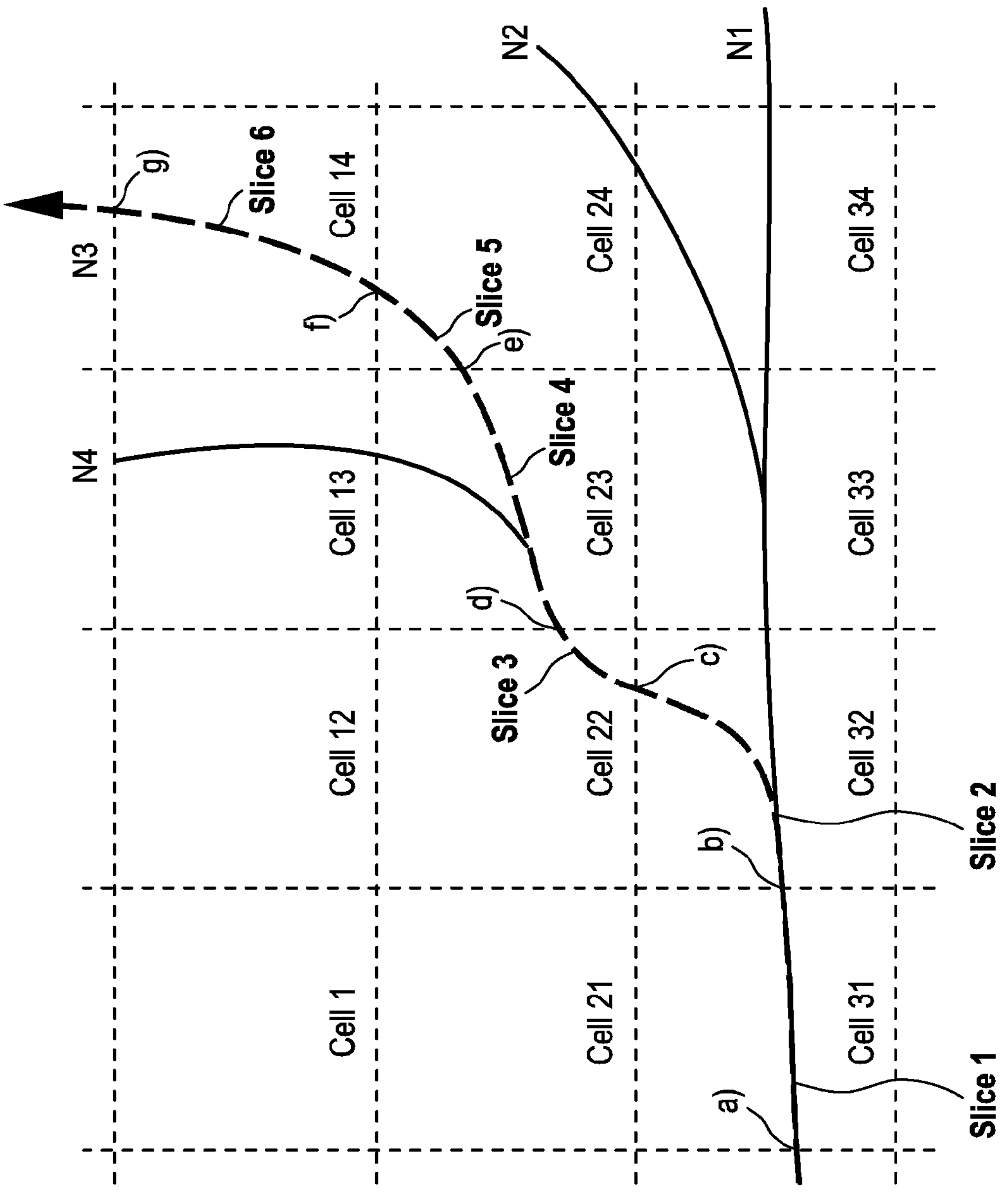
FIG. 5 shows an example of sliced route according to the virtual grid.
Figure 6:
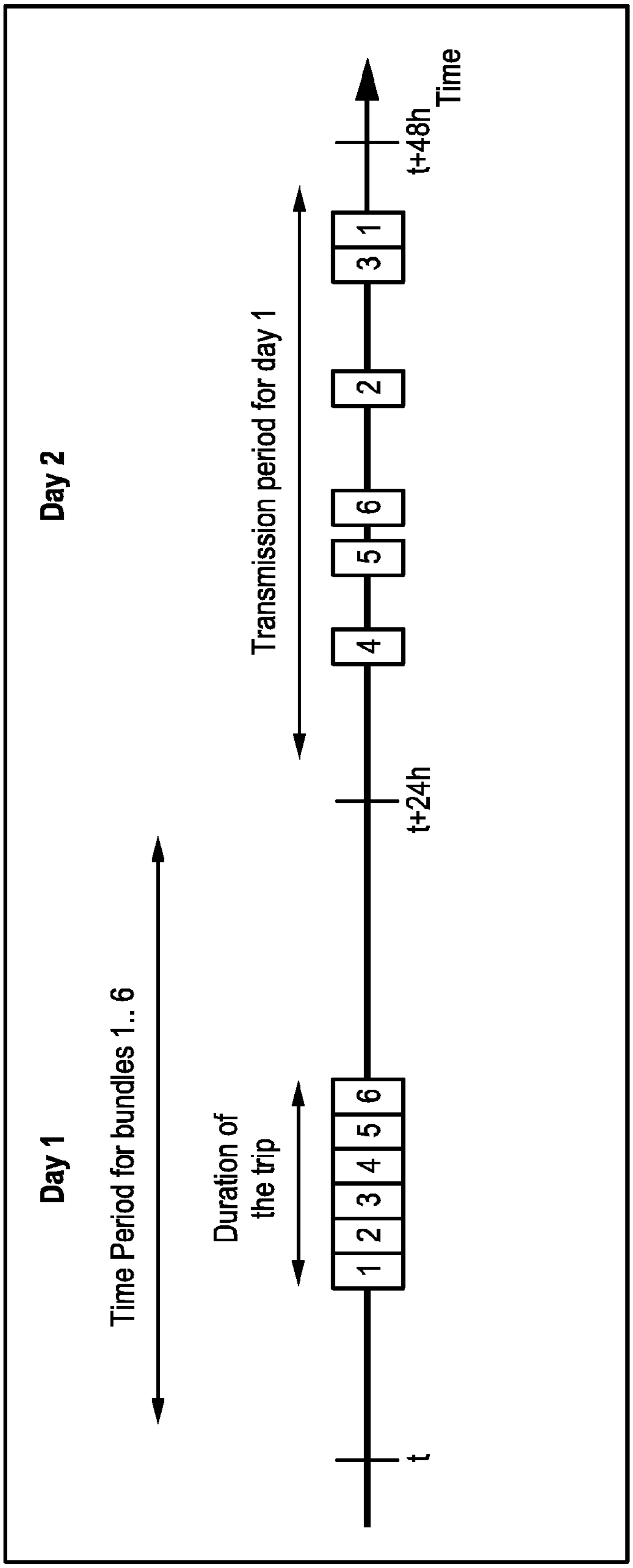
FIG. 6 shows a schematic example of transmission of data bundles to the TS Proxy.

The main principle behind the sub-process shown in FIG. 5 and FIG. 6 is to slice or partition the route of a vehicle into slices. The location data of each individual slice is sent independently to the TS proxy such that it is not possible for the TS proxy to trace back which slices belong to the same vehicle. Therefore, the data transmitted for two neighboring slices may be such that the correlation between the two neighboring slices is as close to zero as possible. This is achieved by the re-sampling step. Otherwise the value of the velocity at the exit of a slice could be used to find the slice that has an initial velocity being closest to said velocity at the exit of the former slice.

Each slice 1 to 6 shown in FIG. 5 and FIG. 6 corresponds to an anonymized location bundle generated by the OBE.

In order to generate these bundles or slices, the OBE applies a virtual grid composed of square cells. The origin and size of the cells of the virtual grid may be derived by means of the GPS coordinates such that there is no need for a digital calculated grid. For instance, one cell may correspond to a 1 arc-minute square in the GPS coordinates, i.e. approx. a 1.8 km wide square). Accordingly, a slice corresponds to the segment of the route of a vehicle that is fully contained in a cell (e.g. in FIG. 5, slice 1 in cell 31 is the segment of the route from (a) to (b), slice 2 in cell 32 is the segment of the route from (b) to (c), slice 3 in cell 22 is the segment of the route from (c) to (d), and so on, slice 6 in cell 14 is the segment of the route from (f) to (g)). Each time a vehicle e.g. travelling itinerary N3, which is depicted as dashed line in FIG. 5, crosses the border of a cell (i.e. in our example each time the minute part of the latitude or longitude changes), the OBE closes the current slice and starts generating a new one.

The OBE generates a new anonymized location bundle for each slice of the route. Each bundle contains an optional random ID field, a sequence of GPS location data corresponding to latitudinal and longitudinal position, and an optional time period field. An example of an anonymized location bundle is set out in FIG. 10C.

The time period field indicates the period during which the slice was collected. As already said this time period cannot be used by the TS proxy to determine accurately the time at which the vehicle was at some given location. The purpose of this field is to optimize the tariff lookup sub-process, and may be required if the tolling scheme may update dynamically the tariff specifications. The time period can be chosen as large as necessary to achieve the desired privacy level, although it will usually depends on the maximum delay that is imposed by the tolling scheme to the OBE to perform the declaration. Advantageously, the time interval during which the slice is traversed is entirely contained within the specified time period. Further, all location bundles for a same route may typically contain the same time period value.

The random ID field contains a random value generated by the OBE. This field is necessary if the TS proxy does not reply immediately with the tariff to apply. In this case this random ID will be used later on by the OBE to request later on the tariff corresponding to each slice it has submitted.

The GPS location data sequence is generated from the set of obtained GPS fixes excluding the timestamp, i.e. the location data corresponding to the route slice as generated by the re-sampling process. It is noted that coordinates in the location bundles may be not exactly the same as the one reported by the re-sampling process. In order to prevent the TS proxy to link two bundles to the same vehicle during the transmission process some counter strategies are applied, which are explained in detail further below in this document. However, the following explanations are exemplary only, since other suitable data transmission schemes, both now known and hereafter developed, also can be employed.

Figure 4:
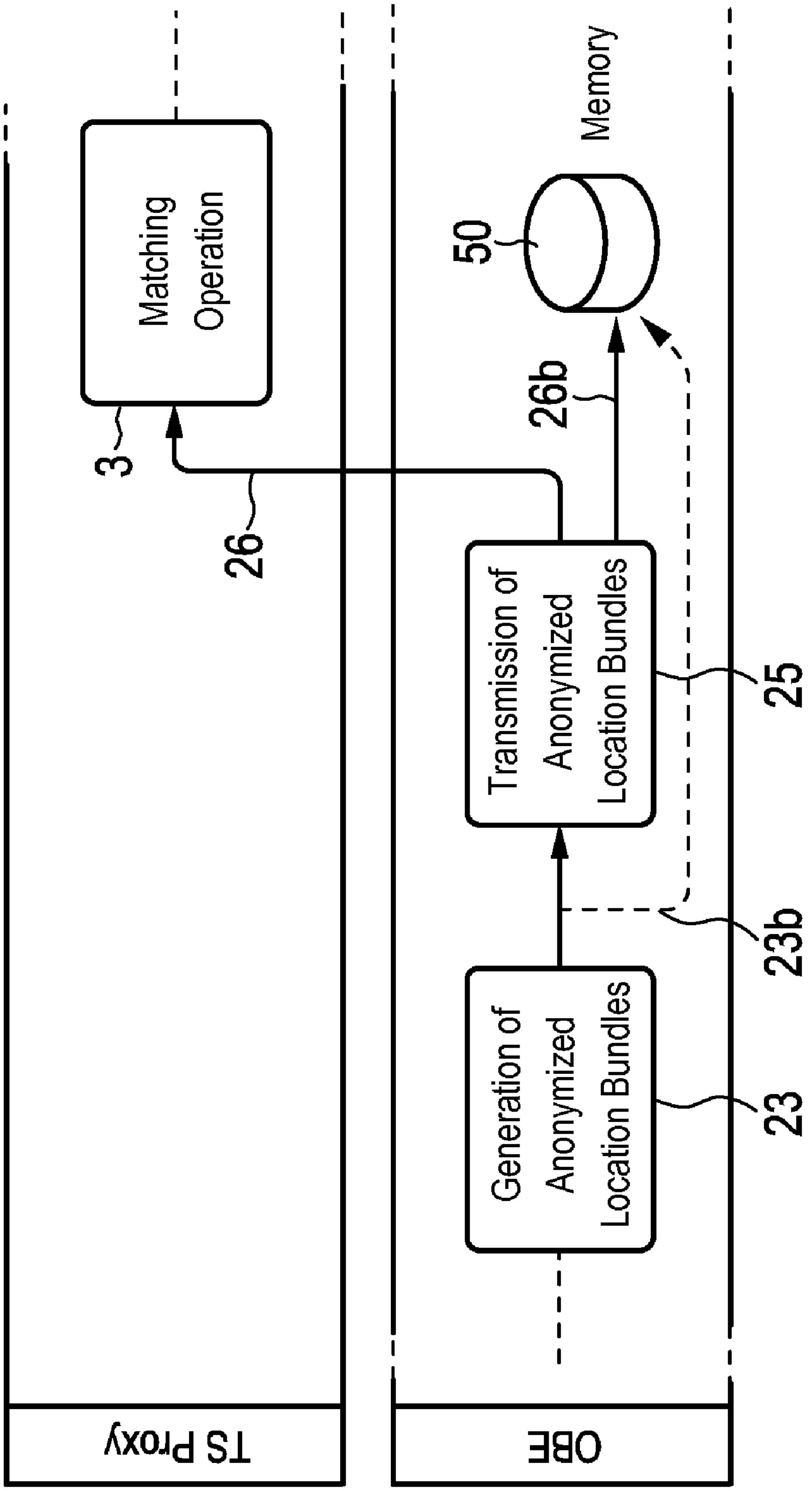
FIG. 4 shows a detail scheme of the transmission process from OBE to TS Proxy.

After generating the anonymized location bundle, the OBE temporarily stores it in its memory 50, as depicted in FIG. 4. This is, to keep these data ready for the transmission process. Moreover, the fee calculation process is done in the OBE based on these stored data corresponding to the travelled itinerary in connection with the fee information provided by stationary entity or TS proxy, as will be discussed later.

Furthermore, the OBE also stores the set of timestamps that were stripped from the bundle in a separate database and associates them with the random ID of the bundle for later retrieval to enable consideration of the time of day when calculating the corresponding fee in accordance with the communicated tariff. In other words, the time of day may be considered when calculating the fee but not when reporting the itinerary to the TS proxy. An example of such timestamps stored by the OBE, one, with random ID data, is set out in FIG. 10D.

Step 25 of FIG. 2 is now explained in detail in connection with FIG. 6.

After generating the anonymized location bundles 1 to 6, the OBE transmits them to the stationary entity or TS proxy to obtain in return the tariff that to be applied for each slice. In order to not disclose accurate time information to the TS proxy regarding the period when one trip is made, the transmission process may be started after an arbitrary amount of time. Such delay may depend on time constraints imposed by the tolling scheme and other implementation constraints on the TS Proxy. For example, the tolling scheme may require that a declaration of routes travelled is made at least within the following two days. Also, the bundles can be sent disordered, trips from different days can be mixed and different delays can be used for each bundle.

As depicted in FIG. 6, the contiguous or coherent slices 1 to 6 belonging to a trip done on day 1 are not instantly transmitted to the stationary entity after generation but stored. Then, on day 2, the slices 1 to 6 are transmitted in a randomized order and with arbitrary delay during the transmission period for day 1, which in our example corresponds to the 24 hours of day 2.

Figure 7:
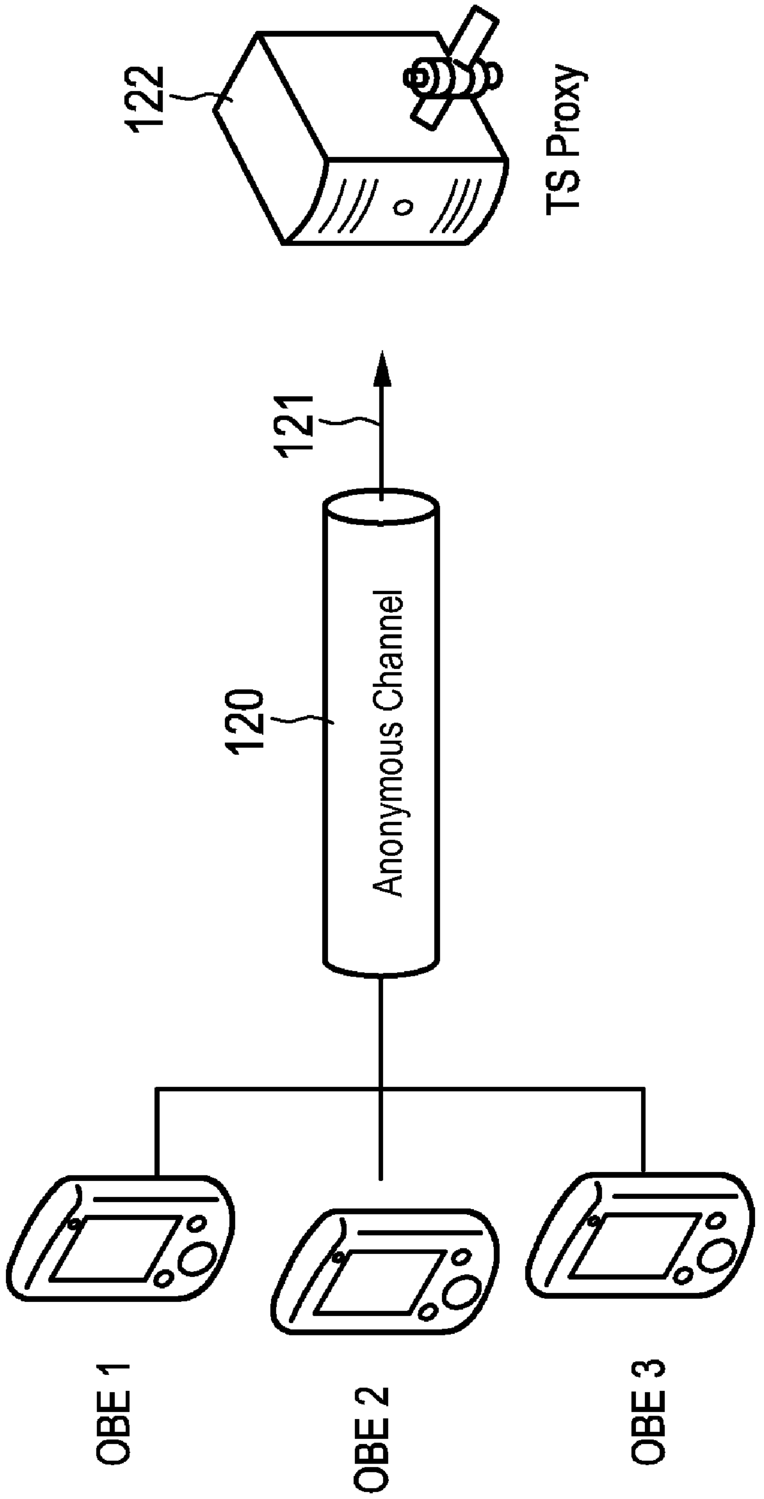
FIG. 7 represents the transmission between the OBE and TS proxy via an anonymous channel.

However, since the stationary system delivers toll-fee information to the OBE having sent said bundles or slices, still a possibility for identification of the originator of the bundles remains, again, lowering privacy of the individual user. In order to prevent traceability to any single party entrusted with transmitting the slices, an anonymous channel 120 depicted in FIG. 7 in conjunction with OBE 1-3 and TS Proxy 122 may be employed.

As an example for a possible transmission line setup the OBE is connected to a GPRS network and accesses the TS proxy through the internet. In such setups, commonly all mobile devices within that network are located behind a NAT (Network Address Translation) server. The NAT server allows for allocating to each OBE an IP address that is in the private range of internet addresses (i.e. these addresses are not accessible from a device that is not part of the private mobile network). Only the NAT server itself has an IP address that is accessible from internet. So, whenever an OBE wants to perform a connection to an internet server (such as the TS Proxy), the NAT will open a connection to that server, and will forward all TCP/IP packets back and forth between the OBE and the TS Proxy. By opening a connection to the TS Proxy, the NAT server will reserve randomly a port on its public internet address, and will forward all TCP/IP packets sent to that port to the OBE that initiated the connection. This means that if several OBE connects to the TS proxy simultaneously, each OBE will be assigned a unique and random port number and the TS proxy will only see a public IP address (the address of the NAT server) and a different port number for each OBE. When the connection is closed, the port is freed and can be reused for another OBE. Later, if a same OBE wants to connect back to the TS proxy, it will be assigned a new port number, and provided that the port allocation scheme is randomized enough, the TS proxy will have no way to relate this connection with a previous connection.

In such situation, the anonymous channel can be built by the OBE by first selecting randomly a location bundle in its memory, and by applying a random delay before opening a connection to the server and sending the location bundle. After transmission, the connection is closed, and the OBE repeats this process until all bundles have been transmitted for the time period. Assuming that the maximum delay is correctly chosen and that each OBE applies the same strategy, it will mean that the location bundles for a same vehicle will be perfectly mixed with those of other OBE.

Referring back to FIG. 2, since the "map matching" performed in step 3 has been explained in connection with FIG. 1 already, the next step explained is the "tariff look-up" process performed in step 40. After identifying to which roads and/or gantry the reported locations correspond to, the TS proxy fetches the specification of the tariff that must be applied for each road/gantry from the tariff database. The tariff database is defined and maintained by the tolling scheme. It assigns a tariff identifier corresponding to the tariff specification that is applicable for the given road segment/gantry to each road segment ID/gantry ID defined in the digital map. The tariff specification may be of various types, such as a fixed price for a certain road segment or gantry passage (examples of such tariff specifications are set out in FIGS. 10E and 10F). Another type is the fixed price that depends on time, such as certain tariffs due for passages during the rush hours. In that case the tariff specification is provided as a table indicating for each period of time of day which price to use when evaluating the fee. Other types of take into account the length of the vehicle unit (including possible trailer), the length of the road segment travelled or a possible physical handicap by the user. Other categories supporting differential pricing also can fall within the scope of this invention. FIG. 10G depicts examples of fixed unitary and time variable tariffs.

After having identified which tariff is applicable, the stationary entity or the TS proxy is configured to produce a tariff bundle that contains all the information that is necessary for letting the OBE compute the fee for the corresponding location bundle. Such a tariff bundle may contain the index of the first fix corresponding to the road segment/gantry, as generated by the map/zone matching process, the length of the road segment or e.g. "0" for a gantry, as generated by the map/zone matching process, and the identifier of the tariff specification to use in the tariff table.

The tariff bundle may also contain a tariff table that contains the tariff specification for each tariff identifier used in the bundle. This specification contains the tariff identifier and a single price in the case of fixed price or fixed unitary price, or a list of time periods along with their applicable prices in the case of variable price or variable unitary price. In the case of variable price, the specification may cover the time period reported in the location bundle.

In the case where several segments/gantries refer to the same tariff specification, this specification is sufficient even if given only once in the tariff table.

In subsequent step 41 depicted in FIG. 2, the tariff bundle generated in the previous sub-process is send to the OBE so that it can compute the fee to pay for each slice of the route. This can be done basically in two ways. The first way is that the TS proxy answers rapidly after submission of the anonymized location bundle. In that case, the connection established by the OBE during the transmission sub-process is kept open until the TS proxy replies with the tariff bundle. The other way is that the TS proxy does not reply immediately. In that case the connection that was established by the OBE during the transmission sub-process is closed after the transmission completes. Before starting the fee calculation process, the OBE may then establish a connection to the TS proxy in order to retrieve the tariff bundles. In order to satisfy the driver's privacy, namely the unlinkability requirement, each request may be made independently. I.e. in the case of the implementation of the anonymous channel described previously, the OBE may close the connection between each tariff bundle request and wait a random delay before making another request. This enables to obtain a different port number and to mix the requests of one OBE among the requests of other OBE.

This is the process followed by the OBE to evaluate the fee after receiving a new tariff bundle as generated in the previous step.

Firstly, the OBE is configured to extract the random ID from the tariff bundle, and searches in its memory for the sequence of timestamps that are associated to that random ID as stored during the anonymized location bundle generation process.

Secondly, the OBE is configured to process each road segment/gantry entry in the tariff bundle. In the case of fixed price or fixed unitary price, the OBE reads the tariff identifier, and uses it to extract the tariff specification from the tariff table. The price indicated in the tariff specification (or the price multiplied by the length of the current segment) is then simply accumulated in some counter that was preliminarily reset at the beginning of the calculation process.

Thirdly, in the case of variable or variable unitary price, the process is similar, except that in order to know which price it has to use in the traffic specification, the OBE first fetches the timestamp corresponding to the fix index specified for the current road segment/gantry (using the table retrieved in step 1 above), and then searches in the traffic table what is the corresponding price to use.

After completion of the process, the calculated fee is simply output to the step 5 comprising the process of aggregation and declaration as already discussed in connection with FIG. 1.

Figure 8:
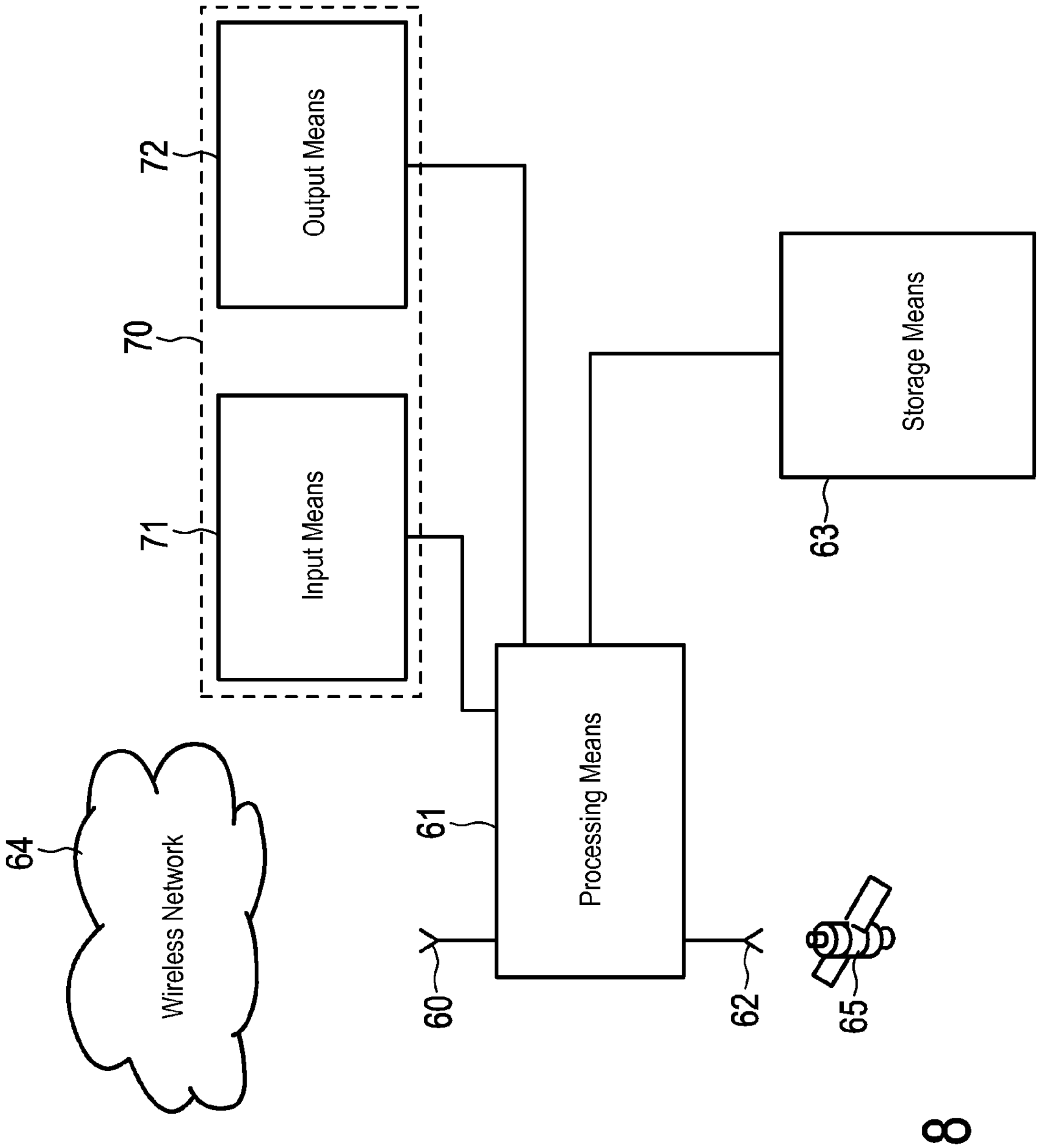
FIG. 8 shows a scheme of main components of an OBE

FIG. 8 shows an overview of the general components comprised in a mobile entity or OBE according to the herein proposed solution. As discussed above, the OBE is arranged to obtain positioning data employing e.g. GPS satellites 65 and receiving means 62 for receiving the GPS signals. The process of GPS positioning is well known to the skilled person and thus herein as such not described in detail. The receiving means 62 may at least comprise an antenna or antennas and signal amplifiers. For processing and evaluating the received and maybe amplified signals, processing means 61 are provided, which may comprise a central processing unit, a programmable processor etc. Also, the OBE can share the required processing power with the processing means of other devices already present in the vehicle, e.g. the OBE can be an extension in form of hardware and/or software to an already present navigation or infotainment system. In such an arrangement, only the positioning signals received (and amplified) by the receiving means 62 of the OBE are passed to said device in the electronic network of the vehicle and subsequently evaluation results are fed back to the OBE.

The OBE may further comprise input means 71 connected to the processing means 61, which may be formed by a keyboard, a keypad, a jog-shuttle, a joystick or any other adequate user interface component. The input means may also be realized as a touch sensitive surface also called touch screen 70, combining graphical input and output capability. The display in turn is a certain realization of output means 72, which besides optical output means may comprise voice output means.

Further, storage means 63 are provided and connected to the processing means 61, which may be a flash memory, a hard disk or any other adequate component for storing e.g. raw GPS data, processed GPS data, information relating to a virtual grid used for slicing collected data etc.

As explained in connection with the processing means, the input means 71, the output means 72 and the storage means 63 do not mandatorily form an integral part of the OBE according to the herein proposed solution. Depending on the kind of vehicle and navigation and/or infotainment system present in the vehicle, various ways of sharing hardware with other devices or control units present in the vehicle are possible and within the scope of the present solution.

The processing means 61 of the OBE also is connected to communication means 60, being arranged to communicate via a wireless network 64 with the stationary entity of the road toll system. The communication means 60 at least comprise an amplifier and at least an antenna. The wireless network 64 may e.g. be a GSM or UMTS network for connecting via the internet to the road toll system.

Figure 9:
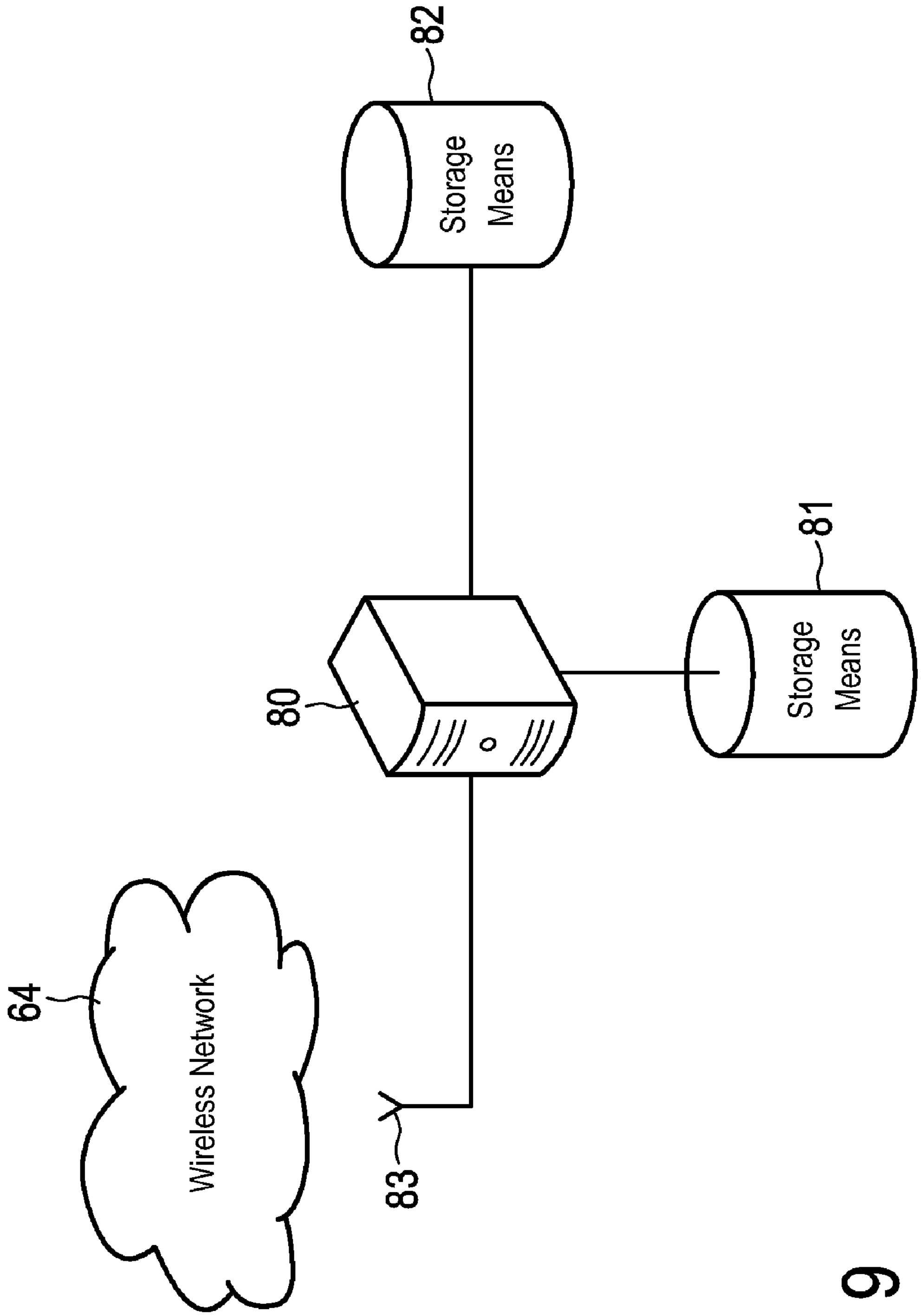

FIG. 9 shows an overview of the general components comprised in a stationary entity according to the herein proposed solution. Data transmitted by the mobile entity via the wireless network 64 forwarded e.g. via the internet are received by receiving means 83 of the stationary entity. The receiving means 83 themselves optionally may be adapted for reception of wireless signals; however in most cases a direct connection to the internet will be more appropriate. In these cases, the receiving means of the stationary entity can be a well known interface for a broad band connection to the internet. For processing of e.g. map matching and tariff look-up operations, processing means 80 are provided, which may comprise a central processing unit, a programmable processor, a server, a multiplicity of servers etc. Several storage means 81, 82 may be connected to the processing means 80 and provide storage for received data, road map data and tariff information. Also, the storage means 81 and 82 can be integrated in the processing means 80, especially if these are servers or a multiplicity of servers.

Summarizing, a road pricing smart client and method for a road pricing system have been disclosed, which enable the removal of information from the positioning data describing the itinerary which suggest private data such as travelling speed and itinerary of the originator of the data. Accordingly, the smart client and method is configured to re-sample the original positioning points of the route into equidistant sections, remove timing information from the positioning data, slice the re-sampled route into slices shaped as those provided by other road users by employing a common "virtual grid". By transmitting the slices in randomized order with an arbitrary delay, coherence of slices corresponding to formerly neighboring portions of the itinerary, are not correlated anymore. However, there is still enough information provided to the toll system to send an excerpt of the fee database allowing the smart pricing client or method to calculate the occurred fees.

The main advantage of the smart client and method is that it delegates in a secure and privacy-preserving way the costly operations to the external toll server proxy. Thus, storage of digital maps in the client is not required, and tariff updates are only transmitted when necessary in a way that preserves privacy. Finally the data transmitted by the smart client can be preprocessed and compressed in order to remove all unnecessary personal information, thereby reducing the bandwidth requirements on the telecommunication network. Further, the proposed solution enables to raise statistics on road usage, i.e. traffic appearance by road-section without endangering privacy of the individual road users.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measured cannot be used to advantage.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

Any reference signs in the claims should not be construed as limiting the scope.

The invention claimed is:

1. A method in a mobile apparatus for valuating at least one characteristic of usage of traffic infrastructure, the method comprising:

processing in the mobile apparatus positioning data representing a route taken by the mobile apparatus in the traffic infrastructure by a) re-sampling the positioning data, b) generating bundles of re-sampled positioning data, and c) re-arranging the generated bundles.

2. A method according to claim 1, wherein the step of re-sampling comprises transforming the positioning data recorded at equidistant points in time into positioning data corresponding to equidistant points in space.

3. A method according to claim 1, wherein generating an individual bundle of the re-sampled positioning data comprises analyzing said re-sampled positioning data with respect to districts defined by a predetermined grid, the districts being cells of a predetermined, standardized virtual grid in a system of geographic coordinates, and creating the bundle as comprising those re-sampled positioning data lying in a same district.

4. A method according to claim 1, wherein the step of re-arranging the generated bundles comprises at least one of:

shuffling said bundles, and shifting of each of said bundles, with respect to a time.

5. A method according to claim 4, wherein the bundles include at least some bundles of more than one particular trip.

6. A method according to claim 1, further comprising delaying the re-arranged bundles by a predetermined time period, before transmission to an external entity for valuating a characteristic of the usage of the traffic infrastructure.

7. A method according to claim 6, wherein the time period is one of at least a single day and multiple trips.

8. A method according to claim 1, further comprising removing a time information associated with each of the positioning data and optionally replacing said time information by a common time period information for all positioning data of one bundle serving for enabling associating a predetermined fee table to a route the positioning data belong to.

9. A method according to claim 1, wherein the positioning data are determined with satellite navigation.

10. A method in a stationary apparatus for valuating at least one characteristic of usage of traffic infrastructure, the method comprising:

i) receiving positioning data from a mobile apparatus, which positioning data is processed by a method according to claim 1;

ii) matching by said stationary apparatus the information contained in said bundles with a database containing information, representing said traffic infrastructure, iii) determining at least one of a partial route taken and a certain position passed by said mobile apparatus iv) associating at least one predetermined route criterion with said partial route or said certain position in said route, and v) transmitting the at least one predetermined route criterion to said mobile apparatus.

11. A method according to claim 10, wherein in the associating step further information on time-dependency of the at least one predetermined route criterion is associated with said partial route or said certain position.

12. A method according to claim 10, wherein the information includes map information.

13. A method comprising:

receiving at least one transmitted predetermined route criterion associated by said mobile apparatus;

receiving positioning data from the mobile apparatus, which positioning data is processed by a method according to claim 1;

matching by a stationary apparatus the information contained in said bundles with a database containing information representing said traffic infrastructure, determining at least one of a partial route taken and a certain position passed by said mobile apparatus associating at least one predetermined route criterion with said partial route or said certain position in said route, and transmitting the at least one predetermined route criterion to said mobile apparatus, and valuating said partial route by said at least one received predetermined route criterion.

14. A mobile apparatus for a system for valuating at least one characteristic of usage of traffic infrastructure, the apparatus comprising:

positioning means configured to estimate positioning data of a traffic infrastructure user in a mobile apparatus;

processing means configured to execute at least steps a) to c) of the method according to claim 1; and transmitting means configured to transmit the re-arranged positioning data to a stationary apparatus of said system.

15. A mobile apparatus according to claim 14, wherein the positioning data are determined with satellite navigation.

16. A stationary apparatus for a system for valuating at least one characteristic of usage of traffic infrastructure, comprising:

receiving means configured to receive positioning data sent by a mobile apparatus according to claim 14, processing means configured to execute the steps of;

matching by said stationary apparatus the information contained in said bundles with a database containing information, representing said traffic infrastructure, determining at least one of a partial route taken and a certain position passed by said mobile apparatus, and associating at least one predetermined route criterion with said partial route or said certain position in said route, and transmitting means configured to transmit the at least one predetermined route criterion to said mobile apparatus.

17. A stationary apparatus according to claim 16, wherein the positioning data are determined with satellite navigation.

18. A system for valuating at least one characteristic of usage of traffic infrastructure, in particular roads, the system comprising:

at least one stationary apparatus for a system for valuating at least one characteristic of usage of traffic infrastructure, comprising:

receiving means configured to receive positioning data sent by a mobile apparatus according to claim 14, processing means configured to execute the steps of;

matching by said stationary apparatus the information contained in said bundles with a database containing information, representing said traffic infrastructure, determining at least one of a partial route taken and a certain position passed by said mobile apparatus, and associating at least one predetermined route criterion with said partial route or said certain position in said route, and transmitting means configured to transmit the at least one predetermined route criterion to said mobile apparatus, and at least one said mobile apparatus, wherein communication between the stationary apparatus and the mobile apparatus is configured such that a communication path, at least partially, comprises at least one of an anonymous channel, a server providing network address translation between the stationary apparatus and the mobile apparatus, a network with an onion router, an intermediate mix and forward proxy using user datagram protocol packets with forged source IP, and a peer-to-peer network, using other mobile apparatus to relay the data of an mobile apparatus.

19. A nontransitory computer-readable storage medium comprising computer program code which when executed on a processor causes the processor to perform the steps of claim 1.

* * * * *